US012770226B2

(12) United States Patent
Yu et al.

(10) Patent No.: US 12,770,226 B2
(45) Date of Patent: Oct. 20, 2026

(54) METHOD FOR ELIMINATING SCRATCHES IN CROSS-SECTIONAL IMAGE OF CABLE

(71) Applicants: ZHEJIANG UNIVERSITY OF SCIENCE AND TECHNOLOGY, Hangzhou (CN); XINJIANG INSTITUTE OF TECHNOLOGY, Aksu (CN)

(72) Inventors: Aihua Yu, Hangzhou (CN); Beiping Hou, Hangzhou (CN); Xiangdong Liu, Aksu (CN); Lina Shan, Hangzhou (CN); Jing Jie, Hangzhou (CN); Wen Zhu, Hangzhou (CN); Gang Li, Hangzhou (CN); Guangxin Zhu, Hangzhou (CN); Shujie Yang, Hangzhou (CN)

(73) Assignees: ZHEJIANG UNIVERSITY OF SCIENCE AND TECHNOLOGY, Hangzhou (CN); XINJIANG INSTITUTE OF TECHNOLOGY, Aksu (CN)

( * ) Notice: Subject to any disclaimer, the term of this patent is extended or adjusted under 35 U.S.C. 154(b) by 156 days.

(21) Appl. No.: 19/023,340

(22) Filed: Jan. 16, 2025

(65) Prior Publication Data

US 2025/0157005 A1 May 15, 2025

Related U.S. Application Data

(63) Continuation of application No. PCT/CN2024/105175, filed on Jul. 12, 2024.

(30) Foreign Application Priority Data

Mar. 1, 2024 (CN) ........................ 202410236604.X

(51) Int. Cl.
*G06T 5/50* (2006.01)
*G06T 5/30* (2006.01)
*G06T 7/00* (2017.01)

(52) U.S. Cl.
CPC .................. *G06T 5/50* (2013.01); *G06T 5/30* (2013.01); *G06T 7/0004* (2013.01);
(Continued)

(58) Field of Classification Search
None
See application file for complete search history.

(56) References Cited

U.S. PATENT DOCUMENTS

2011/0043661 A1 2/2011 Podoleanu
2015/0309274 A1 10/2015 Hurley et al.
2022/0390405 A1 12/2022 Sagues et al.

FOREIGN PATENT DOCUMENTS

CN 106530240 A * 3/2017 ............... G06T 5/73
CN 108280823 A * 7/2018 ............... G06T 7/13
(Continued)

OTHER PUBLICATIONS

Wen Zhu et al, "Segmenting the Semi-conductive Shielding Layer of Cable Slicing Images Using the Convolutional Neural Network"; Polymers, www.mdpi.com/journal/polymers; Sep. 14, 2020. (Year: 2020).*

*Primary Examiner* — David Ometz
(74) *Attorney, Agent, or Firm* — True Shepherd LLC; Andrew C. Cheng

(57) ABSTRACT

The present disclosure provides a method for eliminating scratches in a cross-section image of a cable, comprising: acquiring an original image of a cross-section of the cable, the original image having a first modality; performing, by a processor, dilation and erosion on the original image to obtain a processed image, the processed image having a second modality; fusing, by the processor, the original image
(Continued)

and the processed image to obtain a fused image; processing, by the processor, the fused image to obtain a scratch eliminated image; and applying the scratch eliminated image in actual quality detection of the cable to improve accuracy of the quality detection. By introducing multimodal features, the method relieves the loss of image information. The method can keep the information of the original image as much as possible, and can significantly improve the accuracy of cable quality detection.

3 Claims, 6 Drawing Sheets

(52) U.S. Cl.
CPC ............... *G06T 2207/20036* (2013.01); *G06T 2207/20221* (2013.01); *G06T 2207/30108* (2013.01); *G06T 2207/30168* (2013.01)

(56) References Cited

FOREIGN PATENT DOCUMENTS

| | | | | | |
|---|---|---|---|---|---|
| CN | 111612715 B | * | 9/2022 | ............. | G06N 3/045 |
| CN | 115901804 A | * | 4/2023 | | |

* cited by examiner (a)

(b)

(c)

(a)

(b)

(c)

(a)

(b)

(c)

METHOD FOR ELIMINATING SCRATCHES IN CROSS-SECTIONAL IMAGE OF CABLE

CROSS-REFERENCE TO RELATED APPLICATIONS

This application is a continuation of International Patent Application No. PCT/CN2024/105175 with a filing date of Jul. 12, 2024, designating the United States, now pending, and further claims priority to Chinese Patent Application No. 202410236604.X with a filing date of Mar. 1, 2024. The content of the aforementioned applications, including any intervening amendments thereto, is incorporated herein by reference

TECHNICAL FIELD

The present disclosure relates to a method for eliminating scratches in a cross-sectional image of a cable, and in particular to a method for eliminating scratches in a cross-sectional image of a cable based on an improved total variation (TV) algorithm.

BACKGROUND

As a main carrier for power transmission, the cable is an important part of the power distribution system. It is of great significance to ensure the production quality of cable. The cable typically consists of a conductor, an insulating layer, a shielding layer, and a protective layer. The quality of the cable is generally evaluated by detecting a length of the cable, a thickness of the insulating layer, and a number of conductors. The number of conductors in the cable is one of the most important indexes to determine the quality of the cable. At present, the machine vision is effective to detect the number of conductors in a cross-sectional image of the cable. However, in sample cutting process of the cable, many scratches will be generated to seriously affect the accuracy of detection on the number of conductors. Hence, to improve the accuracy of detection, a method capable of effectively eliminating the scratches in the cross-sectional image is desired.

The present disclosure takes the scratches generated in the cutting process of the cable as noises in the cross-sectional image of the cable, and eliminates the scratches by denoising. There are many image denoising algorithms, mainly including deep learning-based image denoising algorithms and conventional image denoising algorithms.

With the advent of convolutional neural networks (CNNs), and particularly the ImageNet 2012 Challenge, the defect detection algorithm based on the deep learning and the denoising algorithm based on the deep learning have become popular in the field of denoising. Compared with previous algorithms, these methods can achieve desirable performance, but require a large amount of data for model training. Due to an expensive cost of the high-voltage cable, limited sampled data, and disordered scratch-type defects in the cutting process, the requirement on the data amount for model training cannot be met.

The conventional denoising algorithms mainly include spatial-domain denoising, transform-domain denoising, and model-based denoising. The spatial-domain denoising is mainly realized by filters based on the correlation between pixels of the image in the spatial domain. In the classical filter denoising methods, the median filter, mean filter, Wiener filter, and Gaussian filter, such as the vector median filter (VMF), bilateral filter, and tri-state median (TSM) nonlinear filter, can keep the edge and details of the image well, without considering global features. The transform-domain denoising is realized by separating image information from noises through some operations, performing denoising according to characteristics of the noises, and performing inverse transformation to obtain the original image. The common transform-domain denoising algorithms are based on the Fourier transform (FT), the discrete cosine transform (DCT), the wavelet transform (WT), etc. However, this method is defective for the large amount of computation and the dependency on a threshold. The model-based denoising is to model a distribution of noises in the image, and take the distribution as a priori to obtain the clear image and an optimized algorithm. For example, the TV algorithm proposed by Rudin et al. is a universal model used for image denoising with partial differential equations. This model is mainly intended to reduce a sum of gradient integrals in the pixel domain of the image. Although sharp discontinuous points are allowed in the image, the model is susceptible to a staircase effect to cause the texture loss and the image blurring.

SUMMARY OF PRESENT INVENTION

The present disclosure provides a method for eliminating scratches in a cross-sectional image of a cable based on an improved TV algorithm, to overcome the defects and shortages of the prior art.

The present disclosure adopts the following technical solutions:

The present disclosure provides a method for eliminating scratches in a cross-sectional image of a cable, including:

- acquiring an original image of a cross-section of the cable, the original image having a first modality;
- performing, by a processor, dilation and erosion on the original image to obtain a processed image, the processed image having a second modality;
- fusing, by the processor, the original image and the processed image to obtain a fused image;
- processing, by the processor, the fused image to obtain a scratch eliminated image, where the fused image is taken as an input, a TV algorithm is configured in the processor, and the TV algorithm is executed by the processor to eliminate the scratches; and
- applying the scratch eliminated image in actual quality detection of the cable to improve accuracy of the quality detection.

Preferably, the original image of the cross-section of the cable is acquired by an industrial camera.

The scratches are generated by sample cutting in a quality detection process of the cable.

Preferably, a dataset for cross-sectional images of cables is established; the dataset includes cross-sectional images of high-voltage cables of multiple standard sizes; and there are 1000 images in total, with 200 images for each size.

Preferably, there are five standard sizes, including 240 mm, 300 mm, 400 mm, 800 mm, and 1000 mm.

The present disclosure has the following beneficial effects:

The present disclosure provides the novel improved TV algorithm. By introducing multimodal features, the present disclosure relieves the loss of image information caused by the staircase effect in the conventional TV algorithm. While eliminating the scratches, the present disclosure can keep the information of the original image as much as possible, and can significantly improve the accuracy of detection on actual quality of the cable.

DETAILED DESCRIPTION OF THE EMBODIMENTS

Technical solutions of the present disclosure are further described below in detail with embodiments. These embodiments are intended to describe the present disclosure, rather than limit the present disclosure. All other embodiments obtained by a person of ordinary skill in the art based on the embodiments of the present disclosure without creative efforts shall fall within the protection scope of the present disclosure.

Embodiment 1

Figure 1:
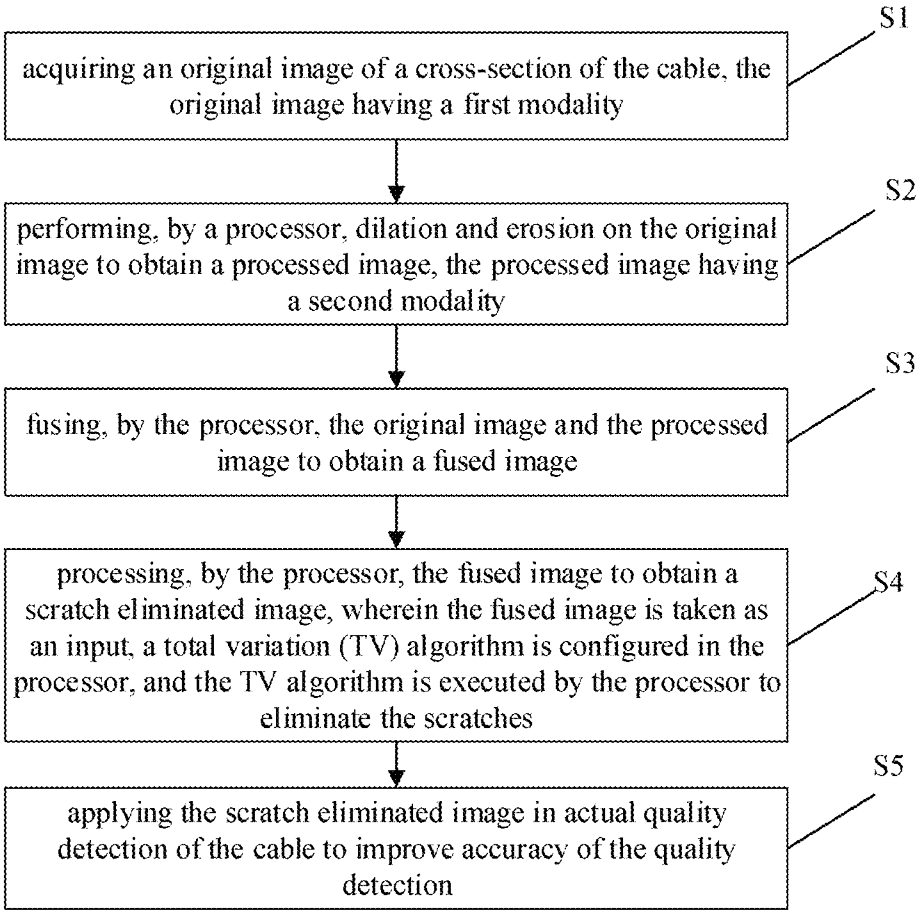
FIG. 1 illustrates a flowchart of a method for eliminating scratches in a cross-sectional image of a cable according to an embodiment of the present disclosure.

As shown in FIG. 1, a method for eliminating scratches in a cross-sectional image of a cable includes the following steps:

In step S1, an original image for a cross-section of the cable is acquired. The original image has a first modality.

In step S2, a processor performs dilation and erosion on the original image to obtain a processed image. The processed image has a second modality.

In step S3, the processor fuses the original image and the processed image to obtain a fused image.

In step S4, the processor processes the fused image to obtain a scratch eliminated image. The fused image is taken as an input. A TV algorithm is configured in the processor. The TV algorithm is executed by the processor to eliminate the scratches.

In step S5, the scratch eliminated image instead of the original image is applied in actual quality detection of the cable to improve accuracy of the quality detection.

Multimodal Fusion

Each source or form of the image can be referred to as a modality. In different modalities, due to different representations and different image information, some information are crossed and complemented. Features of the image can be enriched by fusing information from multiple modalities.

In order to better keep the edge information of the image, a special multimodal fusion method is provided by the present disclosure. The method is mainly intended to perform different operations on the same image, such as sparsification, filtering and morphological processing, to generate different modalities. With analysis and comparison on these operations, the morphological processing is selected by the present disclosure.

The morphological processing includes dilation on the image, and erosion on a dilated image. Similar to the close operation in morphology, it eliminates small gaps between objects and fills up breaks in contour lines. Nevertheless, different structural elements are used herein, and defined as follows:

$$I_B = \mathcal{M}(I_A) \tag{1}$$

$$\mathcal{M}(I_A) = (I_A \oplus S_1) \ominus S_2$$

In the foregoing equation, $I_A$ is the input original image for the cross-section of the cable, $I_B$ is an image obtained by the morphological processing, $S_1$ and $S_2$ are respectively a structural element in the dilation and a structural element in the erosion; and $\mathcal{M}(I_A)$ is a result obtained after the dilation and the erosion on the input image.

Images of two modalities are fused to obtain a fused image $I_{in}$:

$$I_{in} = \alpha I_A + \beta I_B \tag{2}$$

In the foregoing equation, α and β are two modal weights, $0 \le \alpha \le 1$, $0 \le \beta \le 1$, and $\alpha + \beta = 1$.

Improved TV Algorithm

The present disclosure provides the improved TV algorithm. With redundancy and complementarity of the multimodal fusion, the present disclosure enriches the information of the image, weakens the staircase effect, and keeps the edge information of the image better.

The present disclosure takes the image fused with the two modalities as the input of the TV algorithm, and then processes the TV algorithm, thereby eliminating the scratches in the cross-sectional image of the cable.

According to the algorithm, the fused image $I_{in}$ is obtained with Eq. (1) and Eq. (2). The $I_{in}$ is taken as an input of Eq. (3). An initial output image $I_1$ is set as an original image $I_{in}$. Iterative update is performed to obtain an output image I* with the scratch-type defects eliminated:

$$\begin{aligned} I^* &= \arg\min_I J[I(x, y)] \\ &= \arg\min_I \frac{1}{2}\int\int_\Omega [I(x, y) - I_{in}(x, y)]^2\,dxdy + \lambda\int\int_\Omega |\nabla I(x, y)|\,dxdy \end{aligned} \tag{3}$$

In the foregoing equation, Ω represents a pixel domain of the entire image, λ represents a regularization parameter, $$\arg\min_I \frac{1}{2}\int\int_\Omega [I(x, y) - I_{in}(x, y)]^2 dxdy$$

is a fidelity term, $\lambda\iint_\Omega |\nabla I(x, y)|dxdy$ is a multimodality fused TV regularization term, x and y respectively represent a horizontal pixel coordinate and a vertical pixel coordinate of the image, dx and dy respectively represent a horizontal gradient and a vertical gradient, and I(x,y) and ∇I(x, y) respectively represent a grayscale and a gradient of a coordinate (x,y).

Assuming that $$\begin{cases} J[I(x,y)] = \int\int_{\Omega} F\left[x, y, I(x,y), \frac{\partial I}{\partial x}, \frac{\partial I}{\partial y}\right] dxdy, \\ |\nabla I| = \sqrt{\left(\frac{\partial I}{\partial x}\right)^2 + \left(\frac{\partial I}{\partial y}\right)^2}, \\ \nabla I = \frac{\partial I}{\partial x} + \frac{\partial I}{\partial y}, \\ I_x = \frac{\partial I}{\partial x}, \\ I_y = \frac{\partial I}{\partial y}. \end{cases} \tag{4}$$

a loss function F is defined as:

$$\begin{aligned} F &= \lambda |\nabla I| + \frac{1}{2}[I(x,y) - I_{in}(x,y)]^2 \\ &= \lambda \sqrt{\left(\frac{\partial I}{\partial x}\right)^2 + \left(\frac{\partial I}{\partial y}\right)^2} + \frac{1}{2}[I - I_{in}]^2 \end{aligned} \tag{5}$$

In the foregoing equation, F is a simplified form of $$F\left[x, y, I(x,y), \frac{\partial I}{\partial x}, \frac{\partial I}{\partial y}\right].$$

To find a minimum of the function F, Eq. (7) of the function F is obtained with Eq. (6):

$$\begin{cases} \frac{\partial F}{\partial I} = \frac{\partial}{\partial x}\left(\frac{\partial F}{\partial I_x}\right) + \frac{\partial}{\partial y}\left(\frac{\partial F}{\partial I_y}\right), \\ \frac{\partial F}{\partial I} = I(x,y) - I_{in}(x,y), \\ \frac{\partial F}{\partial I_x} = \lambda \frac{\frac{\partial I}{\partial x}}{\sqrt{\left(\frac{\partial I}{\partial x}\right)^2 + \left(\frac{\partial I}{\partial y}\right)^2}} = \lambda \frac{\frac{\partial I}{\partial x}}{|\nabla I|}, \\ \frac{\partial F}{\partial I_y} = \lambda \frac{\frac{\partial I}{\partial y}}{\sqrt{\left(\frac{\partial I}{\partial x}\right)^2 + \left(\frac{\partial I}{\partial y}\right)^2}} = \lambda \frac{\frac{\partial I}{\partial y}}{|\nabla I|}, \end{cases} \tag{6}$$

$$\lambda\left[\frac{\partial}{\partial x}\left(\frac{\frac{\partial I}{\partial x}}{|\nabla I|}\right) + \frac{\partial}{\partial y}\left(\frac{\frac{\partial I}{\partial y}}{|\nabla I|}\right)\right] = I - I_{in} \tag{7}$$

An optimized output image $I_{k+1}$ from a kth iteration is thus obtained:

$$I_{k+1} = I_k - \mu(I_k - I_{in}) + \mu\lambda\left[\nabla \cdot \left(\frac{\nabla I_k}{|\nabla I_k| + \varepsilon}\right)\right] \tag{8}$$

In the foregoing equation, $I_k$ and $\nabla I_k$ respectively represent a grayscale and a gradient of the image in the kth iteration.

Embodiment 2

Figure 2:
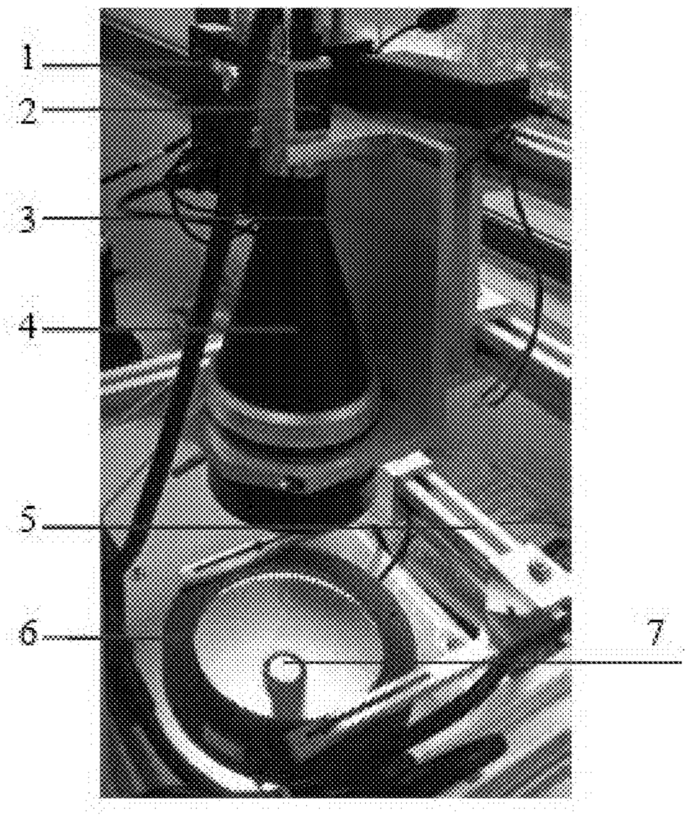
FIG. 2 illustrates a device for acquiring a cross-section of a cable according to the present disclosure.

Referring to FIG. 2, an experimental platform for acquiring cross-sectional images of the cables is constructed. The platform mainly includes a light controller 1, an industrial camera 2, a camera clamp 3, an optical lens 4, an experimental template support 5, an annular light source 6, the cable 7, and a tablet computer. The tablet computer is provided with a Window 10 64-bit operating system.

Figure 3:
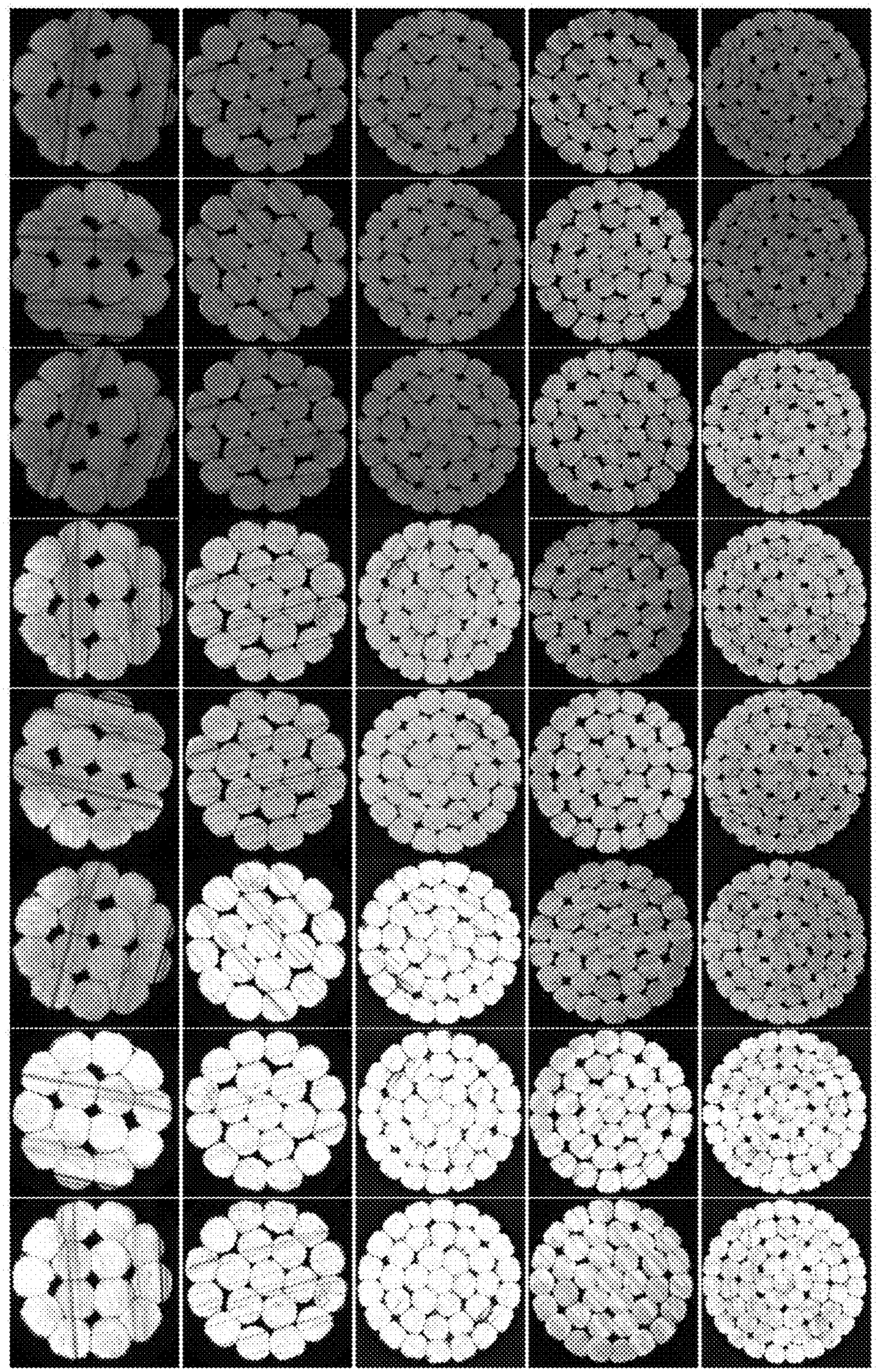
FIG. 3 illustrates some images in a dataset according to the present disclosure.

With the experimental platform, a dataset for the cross-sectional images of the cables is acquired and established. The dataset includes cross-sectional images of cables of five standard sizes, including 240 mm, 300 mm, 400 mm, 800 mm, and 1000 mm. There are 1000 images in total, with 200 images for each size. Some images in the dataset are shown in FIG. 3.

In the following experiments, with the above dataset, the improved TV algorithm (Method A) provided by the present disclosure is compared to the improved frequency domain filtering method (Method B) in the literature (Beiping, H.; Xiaogang, Z.; Wen, Z.; Tianliang, C.; Lingchao, C. *Research on Texture Removal of the Cable Core Image based on Frequency Domain Filtering*. Chinese Journal of Scientific Instrument 2021, 42.) and the conventional TV algorithm (Method C) for analysis. For all experiments, the hardware has Intel® Core™ i5-8250U CPU@1.60 GHz, and the memory of 8.00 GB, and the software environment is MATLAB R2020a.

I. Elimination Effects for the Scratches in the Cross-Sectional Image of the Cable In order to verify performance of the method (Method A) provided by the present disclosure, comparison is made between Method A and Method B based on the dataset. The average elimination rate is used as an evaluation index for each size in the experiment, and is defined as follows:

$$v_p = \frac{1}{N_p}\sum_{i=1}^{N_p} \frac{m_{p,i}}{M_{p,i}} \times 100\%, \; p = 1, 2, \ldots, P \tag{9}$$

In the foregoing equation, $v_p$ represents an average elimination rate for scratches of a high-voltage cable of a pth size, $n_p$ represents a number of images for the cable of the pth size, $M_{p,i}$ represents a total number of scratches in an ith image of the cable of the pth size, $m_{p,i}$ represents a number of scratches eliminated from the ith image of the cable of the pth size, and $N_p$ is a total number of cables in each size, and p represents a total number of sizes of cables.

Figure 4:
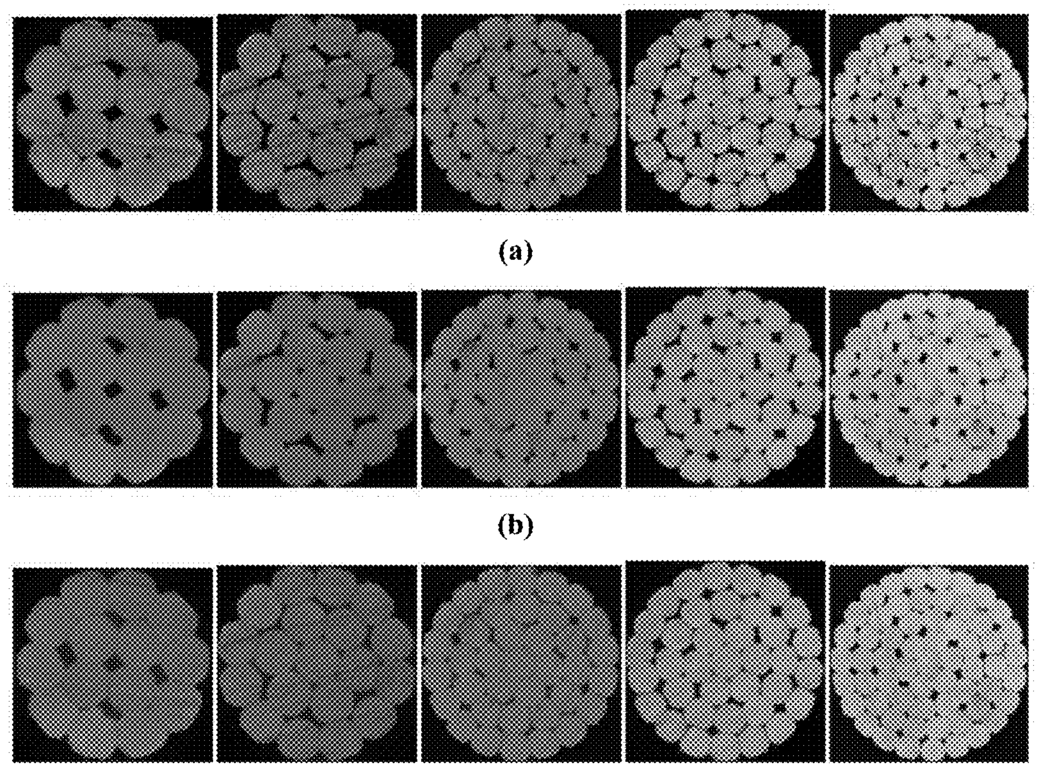
FIG. 4 illustrates elimination effects for scratches in a cross-sectional image of a cable according to the present disclosure.

In the experiment, P=5, $N_{1,2}$ . . . , $_P$=200. FIG. 4 illustrates the elimination effects for the scratches in the cross-sectional image of the cable (some visualization effects in the experiment). In the figure, (a) illustrates the cross-sectional image of the cable with the scratches, (b) illustrates the elimination result of Method A, and (c) illustrates the elimination result of Method B. With the comparison on the experimental results in FIG. 4, it can be found that Method B can eliminate most of shallow scratches, but is undesirable to eliminate deep scratches, and has the particularly unideal elimination effect for the cable with a large number of conductors and complex scratches. These problems are solved well by Method A. As can be seen from FIG. 4, most of scratches can be eliminated by Method A.

In order to further analyze the elimination effect for the scratches, the elimination rate of each sample is counted. For different cables, elimination rates of Method A and Method B for the scratch-type defects are shown in Table 1.

TABLE 1

| Elimination rates | | |
|---|---|---|
| Sample | Method A | Method B |
| 1 | 93.17% | 24.72% |
| 2 | 95.70% | 29.38% |
| 3 | 95.60% | 40.50% |
| 4 | 96.15% | 34.84% |
| 5 | 92.95% | 49.82% |

As can be seen from Table 1, Method B has the elimination rate of about 50% only for some cables, while Method A provided by the present disclosure has the elimination rate of 90% or more for all cables. Compared with Method B, Method A provided by the present disclosure can eliminate almost all of the scratches in some samples. Through intuitive analysis and data analysis on the images, the method provided by the present disclosure is more remarkable to eliminate the scratch-type defects.

II. Detection on the Number of Conductors

In order to verify the higher accuracy of detection on the number of conductors in the cable through the scratch-eliminated cross-sectional image of the cable in Method A, a Hough circle detection algorithm is used to detect the number of conductors based on the dataset. Specifically: 1. The original image is processed with Method A, and the Hough circle detection is performed on the output image. 2. The original image is processed with Method B, and the Hough circle detection is performed on the output image. 3. The Hough circle detection is directly performed on the original image (direct detection). The average detection rate on the number of conductors is used as an evaluation index in the experiment, and is defined as follows:

$$v_{p,k} = \frac{1}{N_p}\sum_{i=1}^{N_p}\frac{d_{p,i}}{D_{p,i}} \times 100\%,\ p = 1, 2, \ldots, P \tag{10}$$

In the foregoing equation, $v_{p,k}$ represents an average detection rate on the number of conductors for a cable of a pth size, $N_p$ is a total number of cables in each size, $D_{p,i}$ represents a total number of conductors in an ith image of the cable of the pth size, and $d_{p,i}$ represents a number of conductors detected in the ith image of the cable of the pth size.

Figure 5:
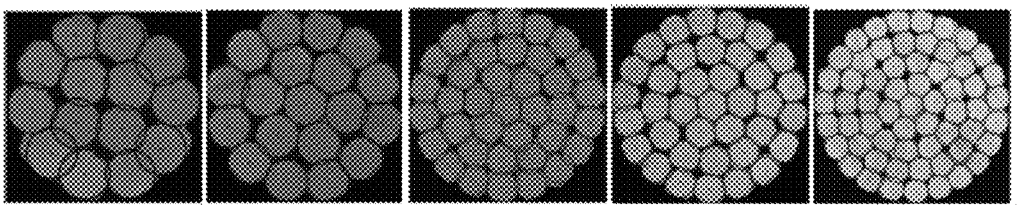
FIG. 5 illustrates detection effects on a number of conductors according to the present disclosure.
Figure 5:
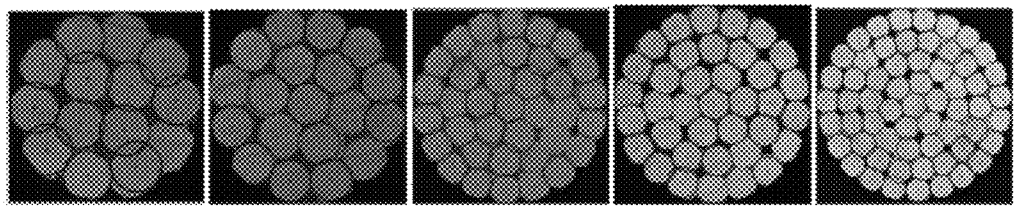
Figure 5:
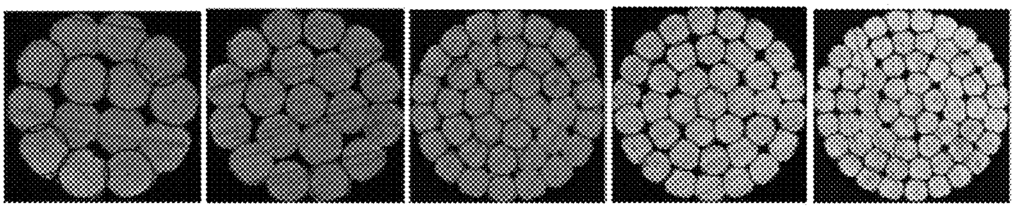

In the experiment, P=5, $N_{1,2,\ldots,p}$=200. FIG. 5 illustrates the detection effects on the number of conductors (some visualization effects in the experiment). In the figure, (a) illustrates the detection effect after Method A is used, (b) illustrates the detection effect after Method B is used, and (c) illustrates the effect of the direct detection. As can be intuitively seen from FIG. 5, there are some deep scratches that separate one conductor into two conductors, thereby affecting the detection on the number of conductors to cause the poor detection effect in the direct detection. In Method B, only the shallow scratches, rather than all scratches, are eliminated in the cable sample, such that some conductors are not detected. Hence, the actual number of conductors is affected by some uneliminated scratches. Compared with the previous two methods, while keeping the edge information of the image, Method A can eliminate most of scratches to improve the accuracy of detection on the number of conductors.

The average detection rates of different methods on the number of conductors are shown in Table 2:

TABLE 2

| Average detection rates | | | |
|---|---|---|---|
| Sample | Method A | Method B | Direct detection |
| 1 | 95.89% | 85.18% | 64.54% |
| 2 | 96.92% | 79.11% | 58.39% |
| 3 | 96.34% | 76.08% | 70.09% |
| 4 | 95.73% | 78.78% | 57.36% |
| 5 | 97.17% | 89.81% | 68.39% |

As can be seen from Table 2, the method (Method A) provided by the present disclosure significantly improves the accuracy of detection on the number of conductors. Specifically, the average detection rate is improved by about 30%. The average detection rate of the method provided by the present disclosure is 1.5 times the average detection rate of Method B.

III. Elimination Experiment

Figure 6:
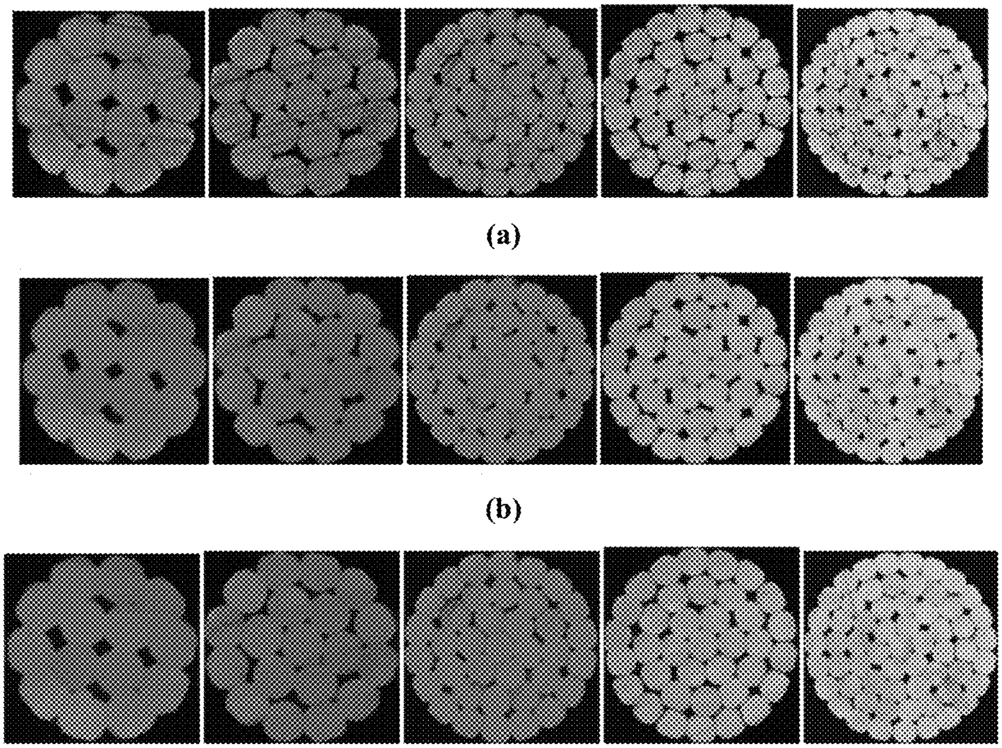
FIG. 6 illustrates image analysis on elimination effects for scratches in a cross-sectional image of a cable according to the present disclosure.

In order to further describe the effect of the present disclosure, the conventional TV algorithm (Method C) is selected for comparison, and the image quality evaluation indexes and the operating time are taken as evaluation standards for scratch elimination. The image quality evaluation indexes mainly include a peak signal-to-noise ratio (PSNR) and a structural similarity index measure (SSIM). The specific elimination effects, namely image analysis on the elimination effects for the scratches in the cross-sectional image of the cable, are shown in FIG. 6. From left to right, there are samples 1-5. In the figure, (a) illustrates the cross-sectional image of the cable with the scratches, (b) illustrates the cross-sectional image of the cable with the scratches eliminated by the method (Method A) provided by the present disclosure, and (c) illustrates the cross-sectional image of the cable with the scratches eliminated by the conventional TV algorithm. Through the comparison on the elimination effects in FIG. 6, both methods can eliminate most of scratches under same experimental data and same experimental parameters. However, some scratches still cannot be eliminated by Method C.

Comparative data of the two methods for eliminating the scratch-type defects are shown in Table 3.

TABLE 3

| Results for eliminating the scratches | | | | |
|---|---|---|---|---|
| Sample | Experimental method | PSNR/dB | SSIM | Operating time/s |
| 1 | Method A | 31.748 | 0.841 | 5.563 |
| | Method C | 30.120 | 0.801 | 4.297 |
| 2 | Method A | 30.227 | 0.804 | 11.437 |
| | Method C | 28.364 | 0.736 | 8.953 |
| 3 | Method A | 31.320 | 0.876 | 29.687 |
| | Method C | 29.302 | 0.833 | 28.375 |
| 4 | Method A | 28.628 | 0.767 | 19.469 |
| | Method C | 26.460 | 0.691 | 23.359 |
| 5 | Method A | 28.136 | 0.772 | 31.109 |
| | Method C | 26.229 | 0.700 | 34.422 |

As can be seen from Table 3, the PSNR and the SSIM of Method A are significantly better than those of Method C. The PSNR of Method A is 0.75 or more basically, which indicates that Method A keeps useful information of the image well, while eliminating the scratch-type defects. Compared with Method C, the overall operating time of Method A is not prolonged nearly for the multimodal operation, Therefore, the present disclosure can significantly improve the performance of the algorithm.

According to the present disclosure, cross-sectional images of cables of different sizes are acquired to establish the dataset, and the cross-sectional images have different numbers and types of scratches. According to the experimental results, the present disclosure can eliminate different types of scratches in the cross-sectional image of the cable effectively, and significantly improve the accuracy of detection on the number of conductors.

Since many scratches remain on the cross-section of the cable in the cutting process to affect the detection on the number of conductors, the present disclosure provides the improved TV algorithm to eliminate the scratches. By performing morphological processing on an input image to obtain a new modality, computing a fused image from two modalities, and taking the fused image as an input for a TV algorithm, the present disclosure eliminates the scratches of the cable. It can be found in the experimental results that the method provided by the present disclosure not only has the elimination rate of 90% or more for the scratches, but also improves the average detection rate on the number of conductors by 30%. Moreover, by introducing the multi-modal features, the present disclosure can eliminate scratches uneliminated by the traditional TV algorithm. With the desirable PSNR and the desirable SSIM, the present disclosure relieves the loss of image information caused by the staircase effect in the traditional TV algorithm.

Therefore, the method provided by the present disclosure can significantly improve the accuracy of detection on the number of conductors, thereby monitoring the quality of the cable more effectively in production.

Finally, it should be noted that the foregoing embodiments are merely used to explain the technical solutions of the present application, but are not intended to limit the present application. Although the present application is described in detail with reference to the foregoing embodiments, the person of ordinary skill in the art should understand that they can still modify the technical solutions described in the foregoing embodiments, or make equivalent substitutions on some or all technical features therein. These modifications or substitutions do not make the essence of the corresponding technical solutions deviate from the spirit and scope of the technical solutions of the embodiments of the present application.

What is claimed is:

1. A method for eliminating scratches in a cross-sectional image of a cable, comprising:

acquiring an original image of a cross-section of the cable, the original image having a first modality;

performing, by a processor, dilation and erosion on the original image to obtain a processed image, the processed image having a second modality;

fusing, by the processor, the original image and the processed image to obtain a fused image;

processing, by the processor, the fused image to obtain a scratch eliminated image, wherein the fused image is taken as an input, a total variation (TV) algorithm is configured in the processor, and the TV algorithm is executed by the processor to eliminate the scratches; and applying the scratch eliminated image in actual quality detection of the cable to improve accuracy of the quality detection.

2. The method according to claim 1, wherein the original image of the cross-section of the cable is acquired by an industrial camera.

3. The method according to claim 1, wherein the scratches are generated by sample cutting in a quality detection process of the cable.

* * * * *